United States Patent
Kawata et al.

(10) Patent No.: US 7,289,185 B2
(45) Date of Patent: Oct. 30, 2007

(54) METHOD OF MANUFACTURING A DISPLAY INCLUDING CHEMICALLY POLISHING, DIVIDING AND MECHANICALLY POLISHING A SUBSTRATE

(75) Inventors: Yasushi Kawata, Ageo (JP); Akio Murayama, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 195 days.

(21) Appl. No.: 10/926,072

(22) Filed: Aug. 26, 2004

(65) Prior Publication Data

US 2005/0046783 A1 Mar. 3, 2005

(30) Foreign Application Priority Data

Sep. 2, 2003 (JP) .............................. 2003-310503

(51) Int. Cl.
*G02F 1/1333* (2006.01)
(52) U.S. Cl. .................. 349/158; 349/187; 216/23
(58) Field of Classification Search ................ 349/158, 349/187; 216/23
See application file for complete search history.

(56) References Cited

U.S. PATENT DOCUMENTS

| | | | | |
|---|---|---|---|---|
| 4,616,403 A | * | 10/1986 | Schulte et al. ............. | 438/59 |
| 5,766,493 A | * | 6/1998 | Shin ............................. | 216/23 |
| 5,835,176 A | * | 11/1998 | Jeong et al. ................. | 349/124 |
| 6,646,711 B2 | * | 11/2003 | Sugano ........................ | 349/187 |
| 6,784,970 B2 | * | 8/2004 | Lee et al. .................... | 349/189 |
| 6,927,834 B2 | * | 8/2005 | Deary et al. ................. | 349/158 |
| 6,930,748 B2 | * | 8/2005 | Moon .......................... | 349/158 |

FOREIGN PATENT DOCUMENTS

| | | |
|---|---|---|
| JP | 5-61011 | 3/1993 |
| JP | 2003-15111 | 1/2003 |
| KR | 2002-0021331 | 3/2002 |

\* cited by examiner

*Primary Examiner*—Andrew Schechter
(74) *Attorney, Agent, or Firm*—Oblon, Spivak, McClelland, Maier & Neustadt, P.C.

(57) ABSTRACT

A method of manufacturing a display device includes a cell forming step of forming a predetermined number of cells on a mother substrate, a first polishing step of chemically polishing an outer surface of the mother substrate with use of a predetermined polishing solution, a dividing step of dividing the chemically polished mother substrate so as to include a number of cells, which is less than the predetermined number, and a second polishing step of mechanically polishing the outer surface of the divided mother substrate with use of a solid polishing agent.

2 Claims, 6 Drawing Sheets

⇩ CHEMICAL POLISHING (0.3 mmt)

⇩

⇩ MECHANICAL POLISHING (0.1 mmt)

FIG. 11

METHOD OF MANUFACTURING A DISPLAY INCLUDING CHEMICALLY POLISHING, DIVIDING AND MECHANICALLY POLISHING A SUBSTRATE

CROSS-REFERENCE TO RELATED APPLICATIONS

This application is based upon and claims the benefit of priority from prior Japanese Patent Application No. 2003-310503, filed Sep. 2, 2003, the entire contents of which are incorporated herein by reference.

BACKGROUND OF THE INVENTION

1. Field of the Invention

The present invention relates generally to a method of manufacturing a display device, and more particularly to a method of manufacturing a display device, which can reduce the thickness of a substrate.

2. Description of the Related Art

Flat display devices, which are typified by liquid crystal displays, are used in various fields of, e.g. OA apparatuses, information terminals, timepieces and TVs, by virtue of features such as light weight, small thickness and low power consumption. In particular, for the high responsivity, liquid crystal display devices using thin-film transistors (TFTs) are widely used as monitors of mobile terminals, computers, etc., which can display a great deal of information.

In recent years, there has been an increasing demand for the advent of thinner, lighter display devices for use in mobile information terminals such as mobile phones and PDAs (Personal Digital Assistants), from the standpoint of design and portability as well as performance. For instance, there is proposed a liquid crystal display device capable of having a thinner structure (see, e.g. Jpn. Pat. Appln. KOKAI Publication No. 5-61011).

However, the yield of display devices, such as liquid crystal displays, which employ thin-plate glass substrates, considerably deteriorates due to the difficulty in handling in a fabrication step of forming the thin-plate glass substrate, or due to the fragility of the thin-plate glass substrate itself.

In the fabrication of the thin-plate glass substrate, a chemical polishing method has advantages such as a low cost and a large polishing amount per unit time. The chemical polishing method, however, has problems such as large non-uniformity in thickness in the polished surface, and the difficulty in obtaining substrates with desired uniform thickness.

BRIEF SUMMARY OF THE INVENTION

The present invention has been made in order to overcome the above-described problems, and the object of the invention is to provide a method of manufacturing a display device, which can make it possible to obtain a substrate with a desired thickness at low cost, in a short time and with high precision, without causing a decrease in yield.

According to an aspect of the present invention, there is provided a method of manufacturing a display device, the method comprising: a cell forming step of forming a predetermined number of cells on a mother substrate; a first polishing step of chemically polishing an outer surface of the mother substrate with use of a predetermined polishing solution; a dividing step of dividing the chemically polished mother substrate so as to include a number of cells, which is less than the predetermined number; and a second polishing step of mechanically polishing the outer surface of the divided mother substrate with use of a solid polishing agent.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A method of manufacturing a display device according to an embodiment of the present invention will now be described with reference to the accompanying drawings. In the embodiment, a liquid crystal display device is described as an example of the display device. The invention is also applicable to a self-luminous display device, such as an organic EL (electroluminescence) display device, which includes a self-luminous element.

Figure 1:
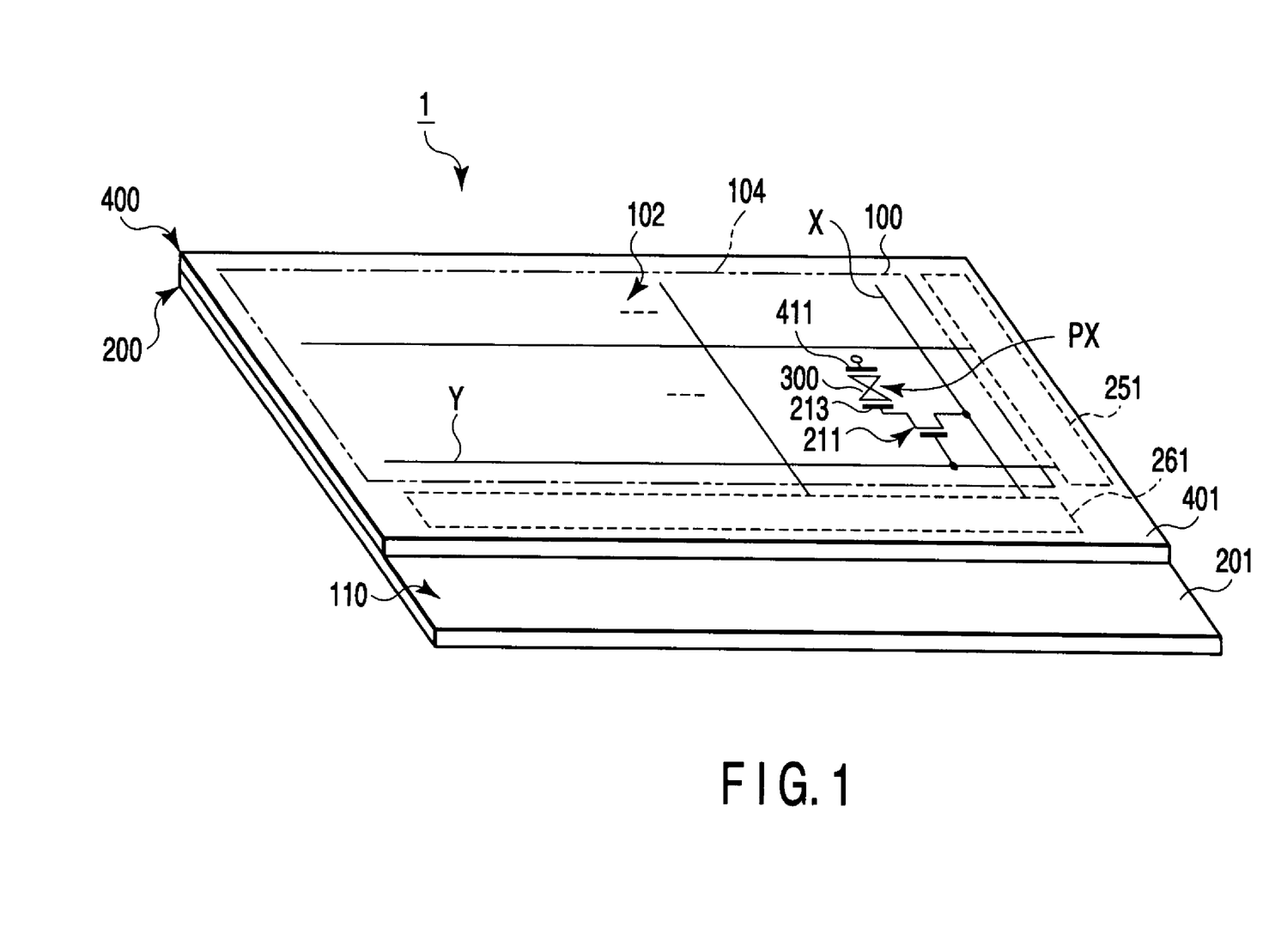
FIG. 1 schematically shows the structure of a display device according to an embodiment of the present invention.

As is shown in FIG. 1, a liquid crystal display device 1 includes a liquid crystal display panel 100. The liquid crystal display panel 100 includes an array substrate 200, a counter-substrate 400, and a liquid crystal layer 300 that is interposed between the array substrate 200 and counter-substrate 400. The liquid crystal display panel 100 includes an effective display section 102 that displays an image. The array substrate 200 and counter-substrate 400 are coupled by means of a sealing member 104 with a predetermined gap for holding the liquid crystal layer 300. The effective display section 102 is formed within a region surrounded by the sealing member 104 in the liquid crystal display panel 100. The effective display section 102 is configured to include a plurality of display pixels PX that are arranged in a matrix.

The array substrate 200 is formed using a glass substrate 201 with a thickness of 0.2 mm or less (0.1 mm in this embodiment). In the effective display section 102, the array substrate 200 includes, on a first major surface (inner surface) thereof, a plurality of signal lines X, a plurality of scan lines Y, a switch element 211 that is disposed in each of the display pixels PX, and a pixel electrode 213 that is connected to the associated switch 211. The signal lines X and scan lines Y are arranged in a matrix so as to cross each other. Each switch element 211 is formed of, e.g. a thin-film transistor that is disposed near an intersection between the associated signal line X and scan line Y. The pixel electrode 213 is formed of a metallic material with light reflectivity or light transmissivity.

The counter-substrate 400 is formed using a glass substrate 401 with a thickness of 0.2 mm or less (0.1 mm in this embodiment). In the effective display section 102, the counter-substrate 400 includes, on a first major surface (inner surface) thereof, a common electrode 411 that is common to all display pixels PX. The common electrode 411 is formed of a metallic material with light transmissivity.

A drive circuit section 110, which is located at a peripheral part of the effective display section 102, includes at least parts of a scan line drive circuit section 251, which is connected to the scan lines Y, and a signal line drive circuit section 261, which is connected to the signal lines X.

The display device using the above-described thin-plate substrates is manufactured through a first thinning step of thinning each substrate, and a second thinning step of further thinning the substrate that is thinned in the first thinning step.

Specifically, the first thinning step is a step of polishing a thick-plate substrate with a relatively large polishing amount so that the substrate may have a thickness close to a desired thickness. The first thinning step adopts a chemical polishing process. The chemical polishing process, in this context, is a polishing step in which a surface portion (outer surface portion) of the glass substrate is changed into water glass using a predetermined polishing solution, for instance, a strong acid solution such as hydrofluoric acid, or a strong alkali solution. The water glass is removed from the surface of the substrate.

Such a so-called chemical polishing process (also called "chemical etching") can be implemented at a relatively low cost and can provide a large polishing amount per unit time, compared to a process of polishing a glass substrate by means of mechanical treatment. The chemical polishing process, however, is a kind of rough polishing. It is difficult to precisely control the thickness of the substrate by the chemical polishing process.

It is thus difficult to reduce the thickness of the substrate to a desired value by the chemical polishing process. In the case where a desired final thickness of a substrate that is to be thinned is set at, e.g. 0.2 mm, it is preferable in terms of a yield and mass-productivity to polish the substrate to a thickness of about 0.3 mm by chemical polishing.

On the other hand, the second thinning step that follows the chemical polishing process is a polishing step in which the substrate with an approximately desired thickness is polished to precisely have the desired thickness with a relatively small polishing amount. Since the substrate needs to be processed with high precision, the second thinning step should advantageously adopt a mechanical polishing process. The mechanical polishing process, in this context, includes cutting, lapping, and polishing with use of a solid polishing agent, such as alumina ($Al_2O_3$) particles or cerium oxide particles.

Compared to the process of polishing the glass substrate by chemical polishing process, such a so-called mechanical polishing process provides a less polishing amount per unit time, but is capable of precisely controlling the thickness of the substrate. In the case where a desired final thickness of a substrate that is to be thinned is set at, e.g. 0.2 mm, if the substrate is already polished to a thickness of about 0.3 mm by the above-mentioned chemical polishing process, the polishing amount in the mechanical polishing process is about 0.1 mm per substrate. Therefore, the substrate with the desired thickness can advantageously be obtained with high precision, without degrading the yield or mass-productivity.

The above-described method of manufacturing the thin-plate substrate further includes a measuring step of measuring the thickness of the substrate that is polished by the chemical polishing in the first thinning step. Based on the thickness of the substrate measured in the measuring step, a polishing amount for mechanical polishing is set in the second thinning step of performing the mechanical polishing. To be more specific, even if non-uniformity in thickness (error in polishing amount) of the substrate occurs due to, e.g. a difference in polishing conditions in the chemical polishing process, it is possible to calculate a proper polishing amount in the mechanical polishing process on the basis of the thicknesses at plural locations on the substrate, which are measured in the measuring step. The substrate with a desired thickness can be obtained with higher precision by performing the above-described mechanical polishing process based on the thus set polishing amount.

From the standpoint of the yield and quality, it is preferable to meet the relationship, $$(b \pm \alpha) - a \geq 0.1 \text{ mm}$$

where $a$ is the thickness of a substrate that is finally obtained in the mechanical polishing process (the desired thickness of the substrate), and $b \pm \alpha$ is the thickness of a substrate that is polished in the chemical polishing process.

The value $\alpha$ corresponds to a maximum value of non-uniformity in thickness on the outer surface (polished surface), relative to an average thickness of the substrate. When the outer surface of each of a pair of substrates is to be polished, as in the case of the liquid crystal display device, the value $\alpha$ corresponds to a maximum value of non-uniformity in thickness on the outer surface (polished surface), relative to an average thickness of each of the paired substrates.

In short, if the polishing amount in the mechanical polishing process, which is determined by $[(b \pm \alpha) - a]$, is at least 0.1 mm or more per substrate, the final target thickness $a$ of the substrate can be realized by setting conditions for the mechanical polishing process. On the other hand, if the polishing amount $[(b \pm \alpha) - a]$ is less than 0.1 mm per substrate, it is very difficult to set conditions for the mechanical polishing process, and there is a fear that the mass-productivity and yield may deteriorate. In consideration of the productivity and yield by the mechanical polishing process, it is particularly preferably that the value α be set at [(b−a)/2] or less.

In the above-described method of manufacturing the liquid crystal display device, the mechanical polishing process in the second thinning step may include a first step using a first polishing agent and a second step that is performed following the first step and uses a second polishing agent that is different from the first polishing agent. In the first step, a so-called lapping process is performed using the first polishing agent with a relatively large grain size. In the following second step, a polishing process is performed using the second polishing agent with a relatively small grain size (i.e. with a grain size less than that of the first polishing agent). Thereby, the substrate with a desired thickness can be obtained with higher precision, and mirror-finishing of the substrate surface can be performed. Moreover, it is possible to suppress a decrease in transmittance of light that passes through the substrate, and to prevent undesirable irregular reflection.

It is preferable that the above-described method of manufacturing the liquid crystal display device further include a step of sealing at least the effective display section 102. After a plurality of display pixels PX are formed in association with the effective display section 102, the effective display section 102 is sealed. Thereby, the polishing solution, which is used in the chemical polishing in the subsequent first thinning step, and the polishing agent, which is used in the mechanical polishing in the second thinning step, are prevented from entering the display pixels PX. It is possible, therefore, to prevent occurrence of defective display on the effective display section 102.

A method of manufacturing a display device using a large-sized mother substrate includes a cell forming step of forming a predetermined number of cells on a first major surface (inner surface) of the mother substrate; a first polishing step of chemically polishing a second major surface (outer surface) of the mother substrate by immersing the second major surface in a predetermined polishing solution; a dividing step of dividing the chemically polished mother substrate so as to include a number of cells, which is less than the aforementioned predetermined number; and a second polishing step of mechanically polishing a major surface of the divided mother substrate, which corresponds to the second major surface, with use of a predetermined polishing agent.

The cell forming step includes a step of forming the effective display section 102 for each of cells, which includes a plurality of display pixels PX arranged in a matrix. The first polishing step in this method corresponds to the above-described first thinning step. Further, the second polishing step corresponds to the above-described second thinning step.

The unit of division in the above-described dividing step is selectable from several modes. For example, the mother substrate may be divided in units of a cell, or in units of a strip-like segment in which a plurality of cells are arranged in one direction.

In fabrication steps subsequent to the first polishing step, a substrate with a very small thickness (e.g. 0.3 mm or less) is handled. Consequently, the substrate tends to be easily bent or curved due to its own weight. In particular, when the substrate, which is in the form of the mother substrate, is subjected to the mechanical polishing process in the second polishing step, a defect such as damage to the substrate tends to easily occur.

In the dividing step, if the mother substrate, which is thinned in the first polishing step, is divided into individual cells or into segments each comprising a plurality of cells, the weight of the mother substrate is divided (i.e. reduced). Thus, bending or curving of the substrate can be suppressed, and the handling of the substrate in the fabrication steps becomes easier. Even if a defect, such as crack or chipping, occurs in a single cell, such a defect is limited to the cell itself or the segment. Unlike the case where the mother substrate as a whole is handled, such a defect does not affect the entire substrate. Therefore, the division of the mother substrate is very advantageous in terms of a yield.

In particular, the method of manufacturing a liquid crystal display device using a thin-plate substrate comprises a cell forming step, which includes a step of coupling two substrates having pixel electrodes 213 and common electrode 411 with a predetermined gap; a first polishing step of chemically immersing outer surfaces of the paired coupled substrates in a predetermined polishing solution; an injection step of injecting a liquid crystal composition 300 between the chemically polished paired substrates; a sealing step of sealing the injected liquid crystal composition; and a second polishing step of mechanically polishing the outer surfaces of the paired substrates, between which the liquid crystal composition is sealed, with use of a predetermined polishing agent.

In this liquid crystal display device, the liquid crystal layer 300 is formed through an injection step and a sealing step. That is, in the injection step, after the empty cell formed in the cell forming step is subjected to chemical polishing, the liquid crystal composition is injected in the empty cell, that is, in the gap between the array substrate 200 and the counter-substrate 400. In the sealing step, the liquid crystal composition is sealed in the cell using a resin material such as an epoxy resin. In the mechanical polishing process in the second polishing step, entrance of the polishing liquid or polishing agent into the cell can be prevented, and occurrence of a display defect can be prevented.

The method of manufacturing a liquid crystal display device using a large-sized mother substrate comprises a cell forming step of forming a predetermined number of cells using a pair of mother substrates; a first polishing step of chemically polishing outer surfaces of the mother substrates by immersing the outer surfaces in a predetermined polishing solution; a dividing step of dividing the chemically polished mother substrates so as to include a number of cells, which is less than the aforementioned predetermined number; an injection step of injecting a liquid crystal composition in each of the divided cells; and a second polishing step of mechanically polishing major surfaces of the divided mother substrate, which correspond to second major surfaces of the mother substrates, with use of a predetermined polishing agent.

The cell forming step includes a step of forming an effective display section 102 for each of cells, which includes a plurality of display pixels PX arranged in a matrix, and a step of coupling a pair of mother substrates, which have pixel electrodes 213 and common electrode 411 in the effective display section 102, with a predetermined gap. The step of coupling the paired mother substrates includes a first sealing step of disposing a first sealing member 104 along an outer periphery of each of the cells, and a second sealing step of disposing a second sealing member so as to surround a plurality of cells on the mother substrate.

As described above, the sealing structure for coupling the two opposed mother substrates should preferably be formed of a double structure that comprises a main seal, which surrounds each of plural effective display sections 102 and secures an injection port for injecting the liquid crystal composition in each of the cells, and a closed annular provisional seal that is provided along an outer edge of the mother substrate in order to prevent the polishing solution, which is used in the chemical polishing process, and the polishing agent and polishing liquid, which are used in the mechanical polishing process, from entering each of the cells.

A gap, which is formed along the outer periphery of the paired mother substrates, affects, e.g. the flow of the polishing solution for use in the chemical polishing process, and tends to cause non-uniformity in polishing. Thus, the provisional seal is disposed at the edge parts of the mother substrates so as not to form such a gap. In addition, the provisional seal needs to have a sufficient width for overlapping with the edge parts of the substrates. From the standpoint of strength, too, the width of sealing should preferably be set at 1 mm or more.

For the reason already described, the large-sized mother substrates, which have been thinned by the chemical polishing process, should preferably be divided. In the dividing step, if the mother substrates are divided into strip-like segments, it is preferable that liquid crystal injection ports be exposed along the divided end face.

In the above-described chemical polishing process, it is known that the thickness of the substrate tends to locally vary due to a flaw or contamination on the substrate surface. This phenomenon appears as a partially uneven topography on the substrate surface. On the other hand, in the mechanical polishing process, polishing is basically effected by contact between a polishing platen and a substrate surface that is an object of polishing. Thus, a local uneven topography does not easily occur. In short, the mechanical polishing process has an advantageous effect of planarizing a partial uneven topography. Therefore, the method of manufacturing the display device, which adopts the mechanical polishing process in the second polishing step, can easily achieve the planarity of the substrate surface.

As is well known, in a case where the two coupled substrates are formed of different materials or have different heat histories, a difference occurs in polishing rate between the substrates in the chemical polishing process. If polishing is performed with a target thickness for each substrate being set at, e.g. 0.3 mm, asymmetry in thickness may occur. That is, one of the substrates may be 0.4 mm thick, while the other may be 0.2 mm thick. On the other hand, when the paired coupled substrates with asymmetric thicknesses are subjected to the mechanical polishing process, it is possible to control the polishing conditions using parameters of the upper and lower polishing platens, thereby advantageously making adjustment to a final target thickness of each substrate. In this respect, too, the above-described method of manufacturing the display device is very excellent.

Next, examples of the present invention will be described.

EXAMPLE 1

Example 1 of the invention relates to a method of manufacturing a plurality of liquid crystal display panels from mother substrates.

Figure 2:
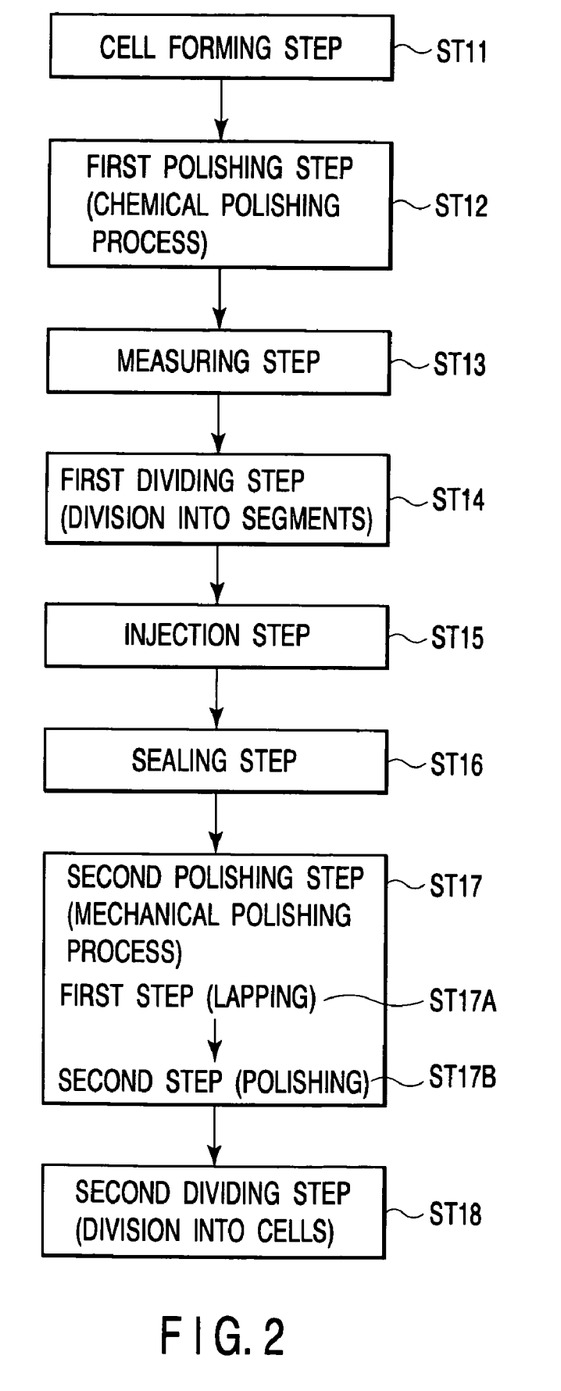
FIG. 2 is a view for explaining a method of manufacturing a display device according to Example 1 of the invention.

To start with, as shown in FIG. 2, in a cell forming step, a predetermined number of empty cells are formed using a pair of mother substrates (ST11). Specifically, two large-sized glass substrates, each having a thickness of 0.6 mm, are prepared. In order to form a plurality of effective display sections in association with cells on a first major surface of one of glass substrates, respective cell regions are provided with various lines, such as scan lines and signal lines, which are arranged in a matrix, and switching elements and pixel electrodes disposed in association with respective display pixels, and, where necessary, color filter layers and orientation films. Thus, a first mother substrate for an array substrate is formed. In addition, in order to form a plurality of effective display sections in association with cells, a first major surface of the other glass substrate is provided with a common electrode in each of the respective cell regions and, where necessary, color filter layers and orientation layers. Thus, a second mother substrate for a counter-substrate is formed. The pair of mother substrates are attached to each other such that their first major surfaces face inwards.

Figure 3:
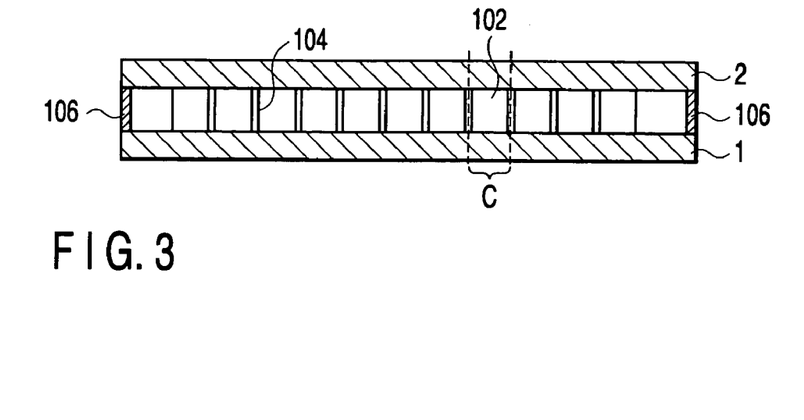
FIG. 3 schematically shows a cross-sectional structure of a pair of mother substrates that are coupled to each other in a cell forming step illustrated in FIG. 2.
Figure 4:
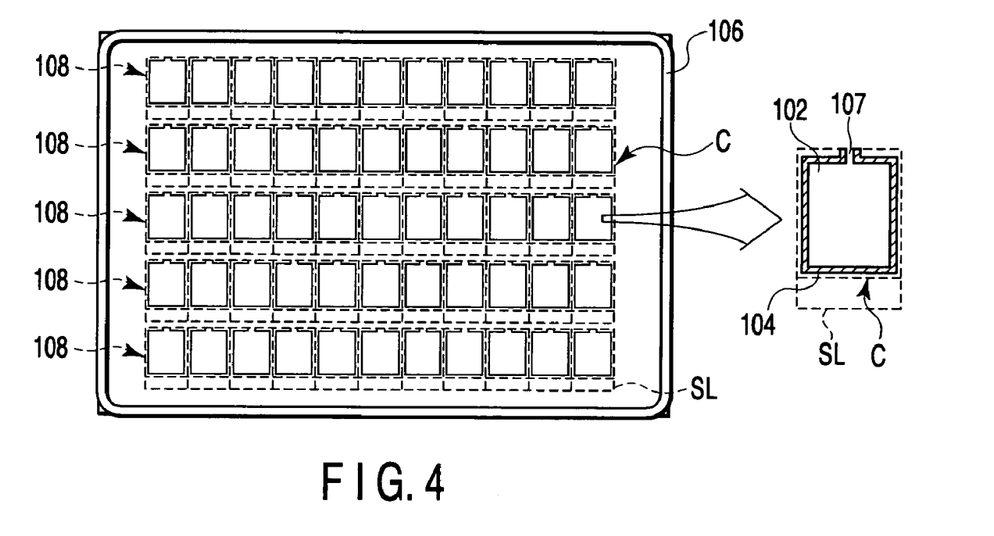
FIG. 4 schematically shows a plan-view structure of the paired mother substrates that are coupled in the cell forming step illustrated in FIG. 2.

In this case, as shown in FIG. 3 and FIG. 4, the first mother substrate 1 and second mother substrate 2 are attached to each other with a predetermined gap by means of a main sealing member (first sealing member) 104, which is disposed so as to surround each effective display section 102, and a provisional sealing member (second sealing member) 106, which is disposed so as to surround all the effective display sections 102 along the outer edges of the first mother substrate 1 and second mother substrate 2. Thereby, empty cells C each having an effective display section 102 are formed. The main sealing member 104 is disposed so as to secure an injection port 107 for injecting a liquid crystal composition into the associated cell C.

The main sealing member 104 and provisional sealing member 106 may be formed of a variety of adhesives such as thermo-setting adhesives and photo-curing (e.g. ultraviolet-curing) adhesives. By heating them at predetermined temperatures or applying light of predetermined wavelengths, the sealing members are cured and the first mother substrate 1 and second mother substrate 2 are coupled.

Subsequently, in a first polishing step, the outer surfaces of the coupled mother substrates 1 and 2 are polished by a chemical polishing process (ST12). Specifically, a hydrofluoric acid solution, for instance, is prepared as a polishing solution. The paired mother substrates 1 and 2 are immersed in the polishing solution. Thereby, the second major. surfaces of the mother substrates 1 and 2 are dissolved and chemically changed into water glass. In this case, the surfaces of the mother substrates 1 and 2 are protected by water glass. Thus, the mother substrates are shaken, where necessary, thereby removing the water glass and keeping the substrate surfaces immersed in the polishing solution at all times.

Figure 5:
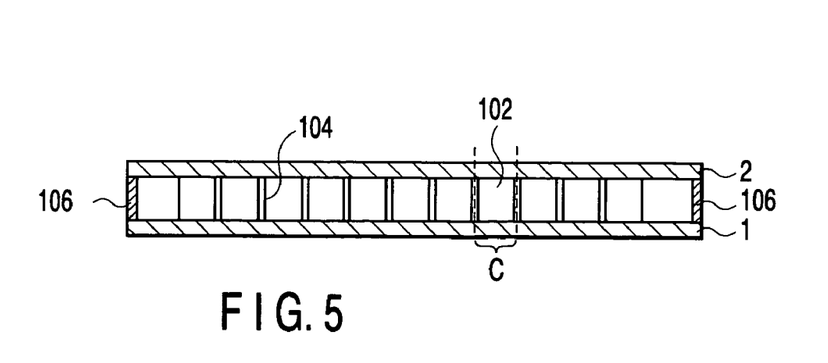
FIG. 5 schematically shows a cross-sectional structure of the paired mother substrates that are subjected to a chemical polishing process in a first polishing step illustrated in FIG. 2.

As is shown in FIG. 5, when the paired mother substrates 1 and 2 have been polished to a preset target thickness, the paired mother substrates 1 and 2 are taken out of the polishing solution. The water glass and polishing solution on the surfaces of the mother substrates 1 and 2 are rinsed away under running water. Thus, the polishing process in the first polishing step is completed. In this chemical polishing process, since all the cells C are sealed by the provisional sealing member 106, no polishing solution enters the cell C.

In a subsequent measuring step, the thickness of each of the paired mother substrates 1 and 2, which are polished by the chemical polishing process, is measured (ST13). In Example 1, the measured thickness of each of the mother substrates 1 and 2 was 0.3 mm±0.05 mm.

Figure 6:
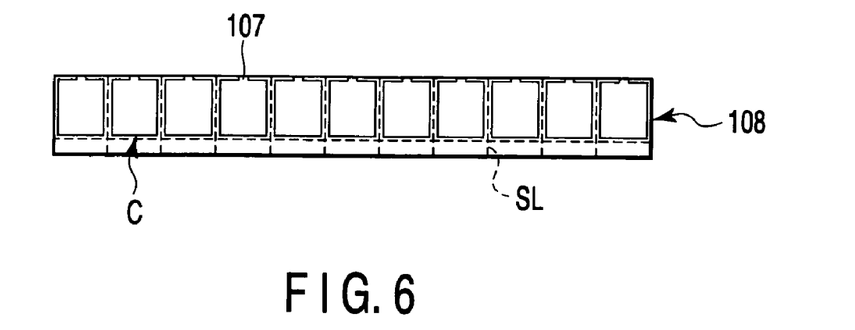
FIG. 6 schematically shows a plan-view structure of a segment that is divided in a first dividing step illustrated in FIG. 2.

In a first dividing step (mother substrate dividing step), the paired mother substrates 1 and 2 are divided into segments each including a plurality of cells C (ST14). In Example 1, the paired mother substrates 1 and 2 are divided into strip-like segments 108 along scribe lines SL, as indicated by broken lines in FIG. 4. Each segment 108, as shown in FIG. 6, is formed such that a plurality of individual cells C are arranged in one direction and the injection port 107 of each cell C is exposed to the divided end face. Methods of dividing the mother substrates are not limited. A $CO_2$ laser or a second- to fourth-order harmonic YAG laser may be used, or a mechanical method may be adopted.

Figure 7:
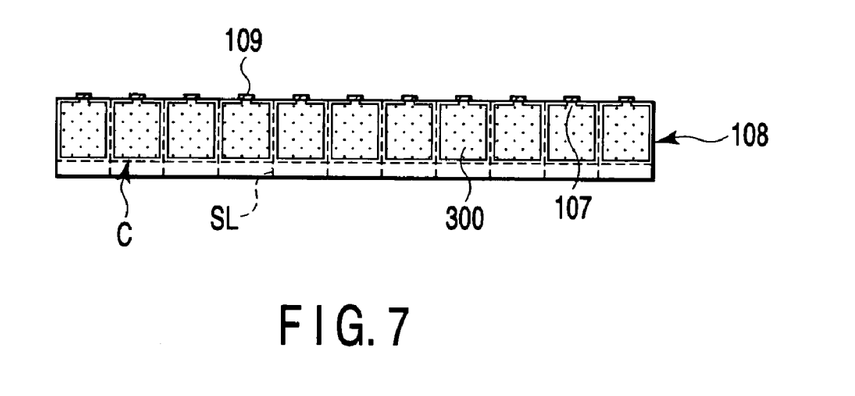
FIG. 7 schematically shows a plan-view structure of the segment in which a liquid crystal composition is sealed in an injection step and a sealing step illustrated in FIG. 2.

In an injection step, the liquid crystal composition 300 is injected from the injection port 107 into each cell C of the segment 108 by means of, e.g. a vacuum injection process (ST15). In a subsequent sealing step, a photo-curing resin 109 such as an epoxy resin is coated on the injection port 107 and is cured by ultraviolet irradiation. Thus, the liquid crystal composition injected in each cell C is sealed (ST16). Thereby, the liquid crystal layer 300 is formed in each cell C of the segment 108, as shown in FIG. 7.

In a second polishing step, the outer surfaces of each segment 108 are polished by a mechanical polishing process (ST17). In the mechanical polishing process, a polishing amount for achieving a desired thickness is set on the basis of the thickness of each substrate that is measured in the previous measuring step (ST13)

In the mechanical polishing process, a first step is executed to perform a lapping process using a polishing agent with a relatively large grain size (ST17A). The polishing amount in the lapping process is set at about 0.1 mm in the case where each substrate is processed to have a thickness of about 0.3 mm in the chemical polishing process. The outer surfaces of the segment 108 are roughly lapped in a relatively short time so that each substrate may have a thickness of about 0.2 mm.

Figure 8:
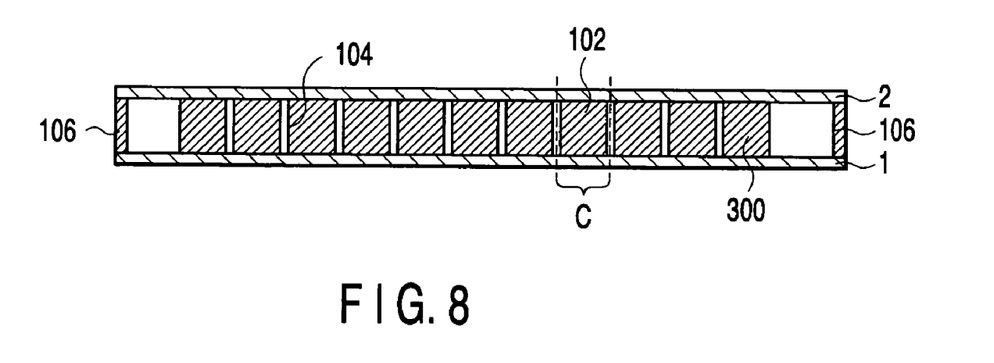
FIG. 8 schematically shows a cross-sectional structure of the paired mother substrates that are subjected to a mechanical polishing process in a second polishing step illustrated in FIG. 2.

In a second step following the lapping process, a polishing process is carried out using a polishing agent, such as cerium oxide, with a relatively small grain size (ST17B). The polishing amount in this polishing process is set at about 0.1 mm in the case where each substrate is processed to have a thickness of about 0.2 mm in the lapping process. At last, as shown in FIG. 8, the outer surfaces of the segment 108 are polished and mirror-finished, taking a relatively long time, so that each substrate may have a thickness of about 0.1 mm.

Figure 9:
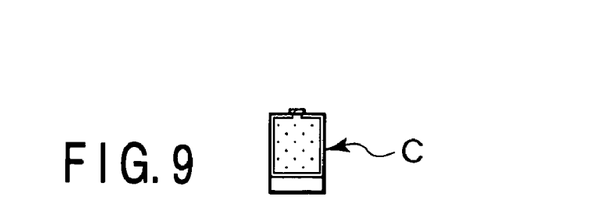
FIG. 9 schematically shows a plan-view structure of a cell that is divided in a second dividing step illustrated in FIG. 2.

In a second dividing step (segment dividing step), the segment 108 is divided into individual cells C (ST18). Specifically, the strip-like segment 108 is divided along scribe lines SL, as indicated by broken lines in FIG. 7, and an individual cell C (i.e. liquid crystal display panel), as shown in FIG. 9, is formed. Methods of dividing the segment 108 are not limited. A $CO_2$ laser or a second- to fourth-order harmonic YAG laser may be used, or a mechanical method may be adopted.

Various wires, polarizer plates, etc. are assembled on the cell C, and a module (i.e. liquid crystal display device) is formed.

According to the above-described Example 1, no damage occurred to the substrates in the first polishing step (ST12) for chemical polishing, the second polishing step (ST17) for mechanical polishing, the mother substrate dividing step (ST14), or the segment dividing step (ST18).

EXAMPLE 2

Example 2 of the invention relates to another method of manufacturing, like Example 1, a plurality of liquid crystal display panels from mother substrates.

Figure 10:
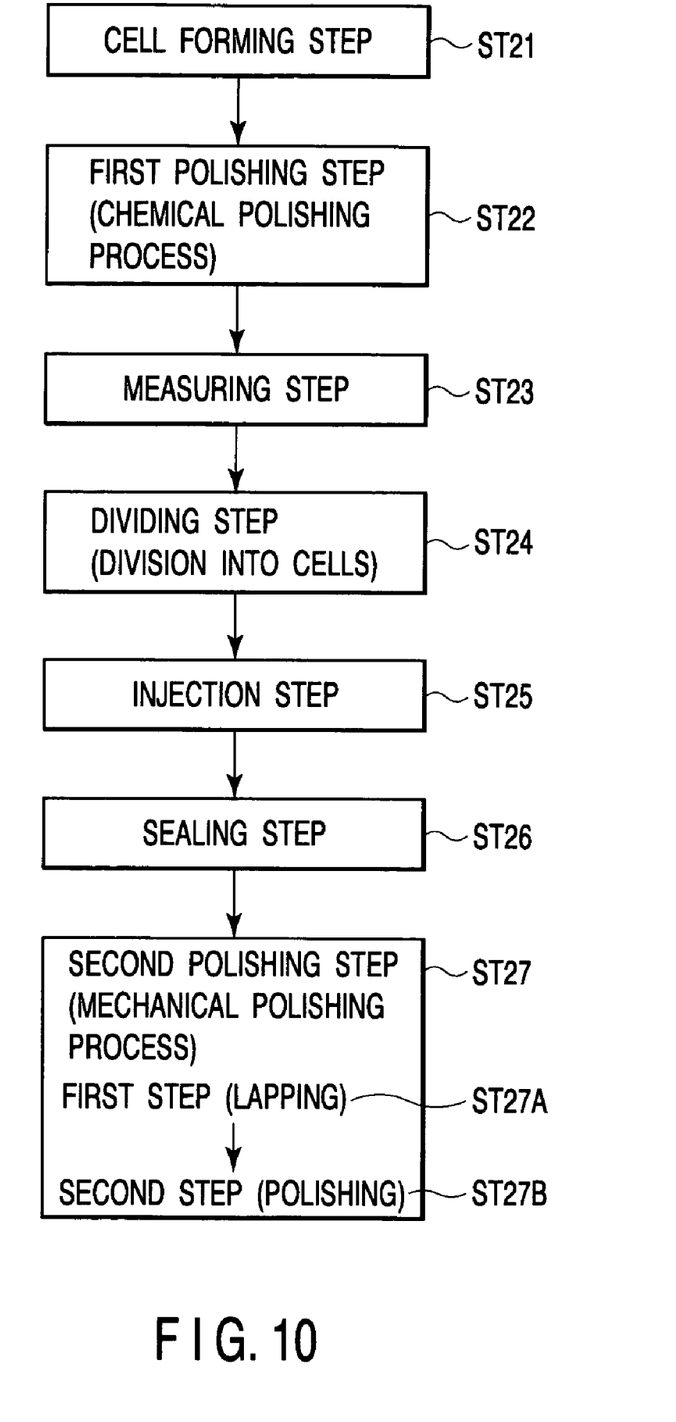
FIG. 10 is a view for explaining a method of manufacturing a display device according to Example 2 of the invention.

To start with, as shown in FIG. 10, in a cell forming step, a predetermined number of empty cells are formed using a pair of mother substrates (ST21). Specifically, two large-sized glass substrates, each having a thickness of 0.7 mm, are prepared. In order to form a plurality of effective display sections in association with cells on a first major surface of each of glass substrates, respective cell regions are provided with various lines, switching elements, pixel electrodes, and a common electrode, and, where necessary, color filter layers and orientation films. Thus, a first mother substrate for an array substrate and a second mother substrate for a counter-substrate are formed. The pair of mother substrates are attached to each other such that their first major surfaces face inwards.

Figure 11:
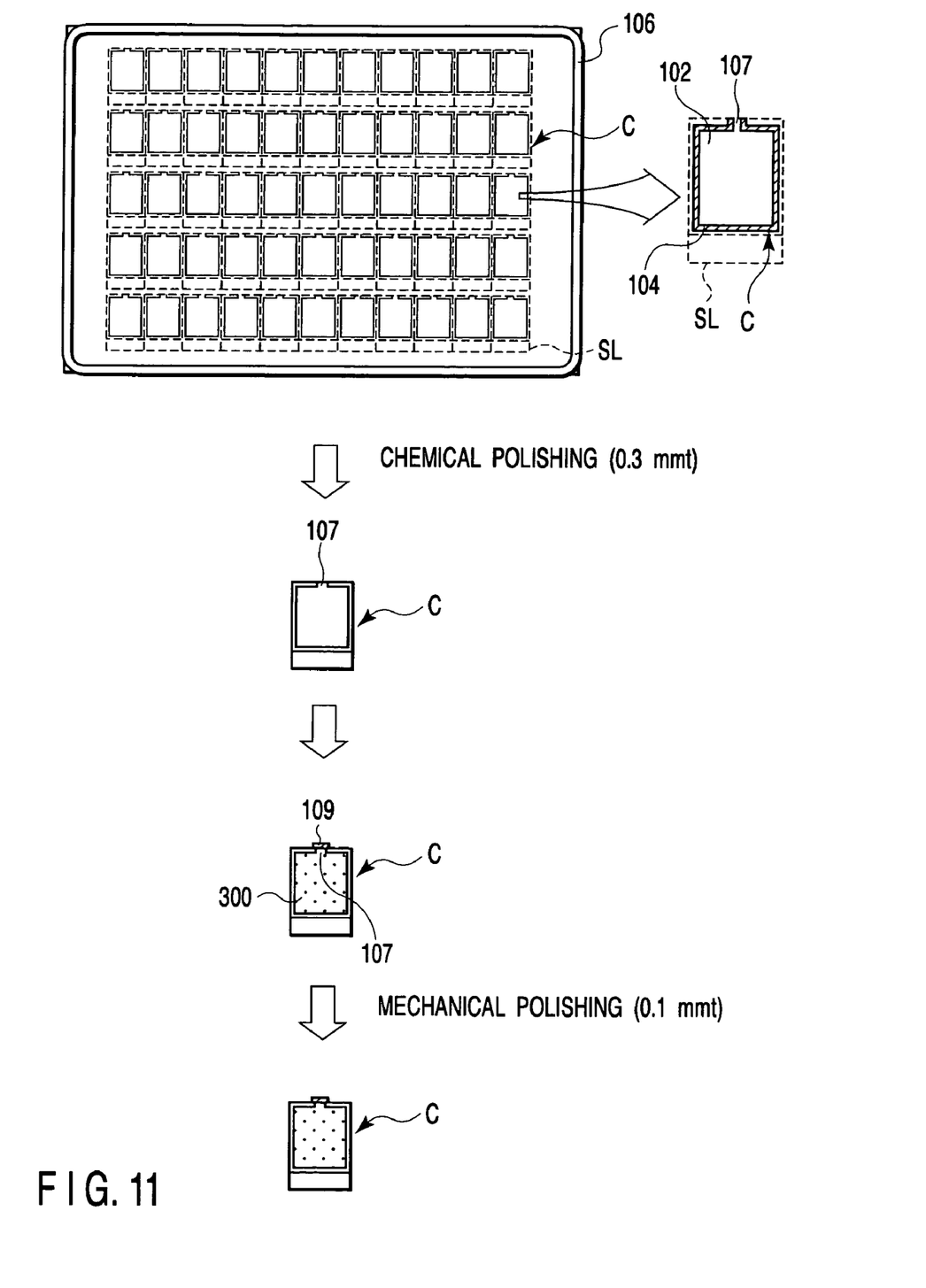
FIG. 11 schematically shows plan-view structures of a cell in the respective fabrication steps illustrated in FIG. 10.

In this case, as shown in FIG. 11, the first mother substrate 1 and second mother substrate 2 are attached to each other with a predetermined gap by means of a main sealing member (first sealing member) 104, which is disposed so as to surround each effective display section 102, and a provisional sealing member (second sealing member) 106, which is disposed so as to surround all the effective display sections 102 along the outer edges of the paired mother substrates 1 and 2. Thereby, empty cells C each having an effective display section 102 are formed. The main sealing member 104 is disposed so as to secure an injection port 107 for injecting a liquid crystal composition into the associated cell C.

Subsequently, in a first polishing step, the outer surfaces of the coupled mother substrates 1 and 2 are polished by a chemical polishing process (ST22). Specifically, a hydrofluoric acid solution, for instance, is prepared as a polishing solution. The paired mother substrates 1 and 2 are immersed in the polishing solution. Thereby, the second major surfaces of the mother substrates 1 and 2 are dissolved and chemically changed into water glass. In this case, the surfaces of the mother substrates 1 and 2 are protected by water glass. Thus, the mother substrates are shaken, where necessary, thereby removing the water glass and keeping the substrate surfaces immersed in the polishing solution at all times.

As is shown in FIG. 11, when the paired mother substrates 1 and 2 have been polished to a preset target thickness, the paired mother substrates 1 and 2 are taken out of the polishing solution. The water glass and polishing solution on the surfaces of the mother substrates 1 and 2 are rinsed away under running water. Thus, the polishing process in the first polishing step is completed. In this chemical polishing process, since all the cells C are sealed by the provisional sealing member 106, no polishing solution enters the cell C.

In a subsequent measuring step, the thickness of each of the paired mother substrates 1 and 2, which are polished by the chemical polishing process, is measured (ST23). In Example 2, the measured thickness of each of the mother substrates 1 and 2 was 0.4 mm±0.03 mm.

In a dividing step, the paired mother substrates 1 and 2 are divided into a plurality of cells C (ST24). In Example 2, the paired mother substrates 1 and 2 are divided into individual empty cells C along scribe lines SL, as indicated by broken lines in FIG. 11. Like Example 1, methods of dividing the mother substrates 1 and 2 are not limited.

In an injection step, the liquid crystal composition 300 is injected from the injection port 107 into each empty cell C by means of, e.g. a vacuum injection process (ST25). In a subsequent sealing step, a photo-curing resin 109 such as an epoxy resin is coated on the injection port 107 and is cured by ultraviolet irradiation. Thus, the liquid crystal composition injected in each cell C is sealed (ST26). Thereby, the liquid crystal layer 300 is formed in each cell C, as shown in FIG. 11.

In a second polishing step, the outer surfaces of each cell C is polished by a mechanical polishing process (ST27). In the mechanical polishing process, a polishing amount for achieving a desired thickness is set on the basis of the thickness of each substrate that is measured in the previous measuring step (ST23).

In the mechanical polishing process, a first step is executed to perform a lapping process using a polishing agent with a relatively large grain size (ST27A). The polishing amount in the lapping process is set at about 0.1 mm or more in the case where each substrate is processed to have a thickness of about 0.4 mm in the chemical polishing process. The outer surfaces of the cell C are roughly lapped in a relatively short time so that each substrate may have a thickness of about 0.3 mm.

In a second step following the lapping process, a polishing process is carried out using a polishing agent, such as cerium oxide, with a relatively small grain size (ST27B). The polishing amount in this polishing process is set at about 0.1 mm in the case where each substrate is processed to have a thickness of about 0.2 mm in the lapping process. The outer surfaces of the cell C are polished and mirror-finished, taking a relatively long time, so that each substrate may have a thickness of about 0.1 mm. Thereby, an individual cell C (i.e. liquid crystal display panel), as shown in FIG. 11, is formed.

Various wires, polarizer plates, etc. are assembled on the cell C, and a module (i.e. liquid crystal display device) is formed.

According to the above-described Example 2, no damage occurred to the substrates in the first polishing step (ST22) for chemical polishing, the second polishing step (ST27) for mechanical polishing, or the dividing step (ST24).

COMPARATIVE EXAMPLE

In a comparative example, a plurality of empty cells were formed using a pair of mother substrates. Then, the outer surfaces of the paired mother substrates were polished by a chemical polishing process. Each substrate was polished to a desired final thickness by the chemical polishing process alone. The final target thickness of each substrate was set at 0.1 mm. At the time the chemical polishing process was completed, the thickness of the entire substrate was 0.2 mm. In this state, the mother substrates were divided by an ordinary method. A liquid crystal composition was injected in each individual cell by, e.g. a vacuum injection process.

In the manufacturing method of the comparative example, there is a large non-uniformity in thickness in the surface of the substrate. In the comparative example, three of seven substrates were damaged due to handling in the step of dividing the substrates into cells.

As has been described above, in this invention, when a display device using thin-plate substrates is manufactured, a chemical polishing process is adopted in the first thinning step (first polishing step) for thinning the substrates. The chemical polishing process can be performed at relatively low cost, can provide a large polishing amount per unit time, and is capable of rough polishing in a short time period. In the second thinning step (second polishing step) that follows the first thinning step, a mechanical polishing process is adopted. The mechanical polishing process provides a small polishing amount per unit time, and can precisely control the thickness of each substrate.

In this case, the time needed for the mechanical polishing process can be reduced by polishing each substrate to a thickness close to a desired final thickness by the chemical polishing process. Moreover, the cost for the mechanical polishing process can be reduced. Accordingly, when the substrate is to be thinned, the mechanical polishing process is performed following the chemical polishing process. Thereby, it becomes possible to obtain the substrate with a desired thickness at low cost, in a short time, and with high precision.

Besides, in the method of manufacturing a display device using large-sized substrates, after the first thinning step, the large-sized substrates are divided into a plurality of small segments or a plurality of cells. Thereby, the weight of the substrates is divided and reduced, and damage to the substrates is prevented. In addition, since the mechanical polishing process in the second thinning step is performed in the state in which the substrates are divided into segments or cells, good controllability for the thickness of the substrate is achieved and no damages, such as crack or chipping, occur in the substrates in the polishing step or in the dividing step. A thin display device can be provided with a high yield.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a display device, the method comprising:
   a cell forming step of forming a predetermined number of cells on a mother substrate;
   a first polishing step of chemically polishing an outer surface of the mother substrate with use of a predetermined polishing solution;
   a dividing step of dividing the chemically polished mother substrate so as to include a number of cells, which is less than said predetermined number;
   a second polishing step of mechanically polishing the outer surface of the divided mother substrate with use of a solid polishing agent; and
   a measuring step of measuring a thickness of the mother substrate that is polished in the first polishing step,
   wherein in the second polishing step, a polishing amount of mechanical polishing is set on the basis of the thickness of the mother substrate that is measured in the measuring step.

2. A method of manufacturing a display device, the method comprising:
   a cell forming step of forming a predetermined number of cells on a mother substrate;
   a first polishing step of chemically polishing an outer surface of the mother substrate with use of a predetermined polishing solution;
   a dividing step of dividing the chemically polished mother substrate so as to include a number of cells, which is less than said predetermined number; and
   a second polishing step of mechanically polishing the outer surface of the divided mother substrate with use of a solid polishing agent, wherein a polishing amount in the second polishing step is set at 0.1 mm or more.

* * * * *